July 21, 1953  J. J. THAYER  2,646,270
WEIGHING MACHINE
Filed Aug. 13, 1949  5 Sheets-Sheet 1

INVENTOR.
Josephus J. Thayer
BY
Thiess, Olson & Mecklenburger
Att'ys

July 21, 1953  J. J. THAYER  2,646,270
WEIGHING MACHINE
Filed Aug. 13, 1949  5 Sheets-Sheet 3

INVENTOR.
Josephus J. Thayer
BY
Thiess, Olson & Mecklenburger
Attys

July 21, 1953  J. J. THAYER  2,646,270
WEIGHING MACHINE
Filed Aug. 13, 1949  5 Sheets-Sheet 4
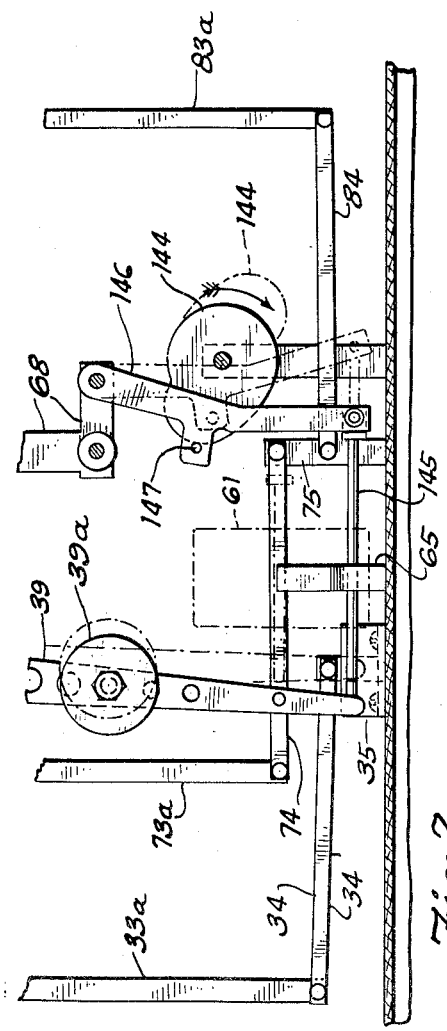
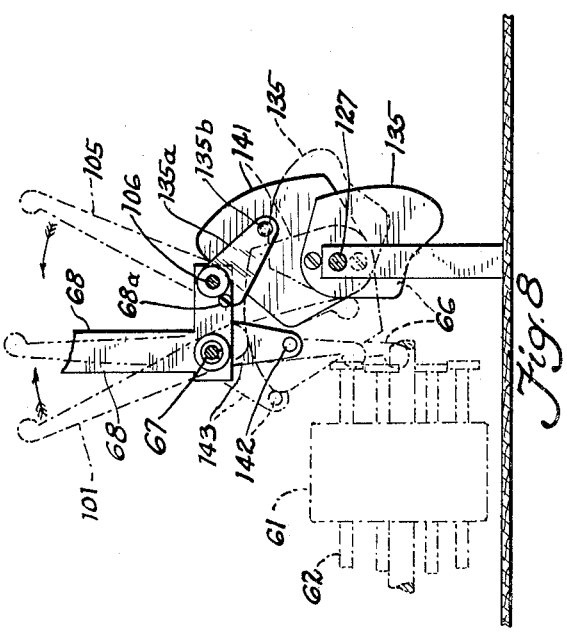
INVENTOR.
Josephus J. Thayer
BY
Kiess, Olson E Mecklenburger
Att'ys July 21, 1953  J. J. THAYER  2,646,270
WEIGHING MACHINE
Filed Aug. 13, 1949   5 Sheets-Sheet 5
Fig. 9
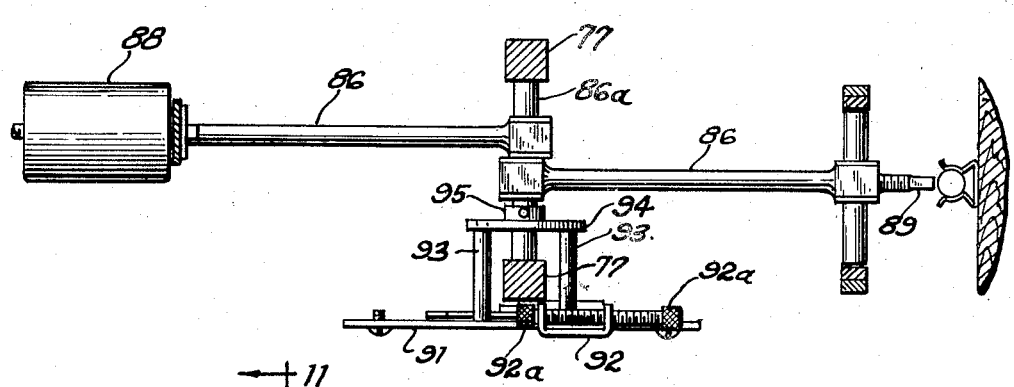
Fig. 10
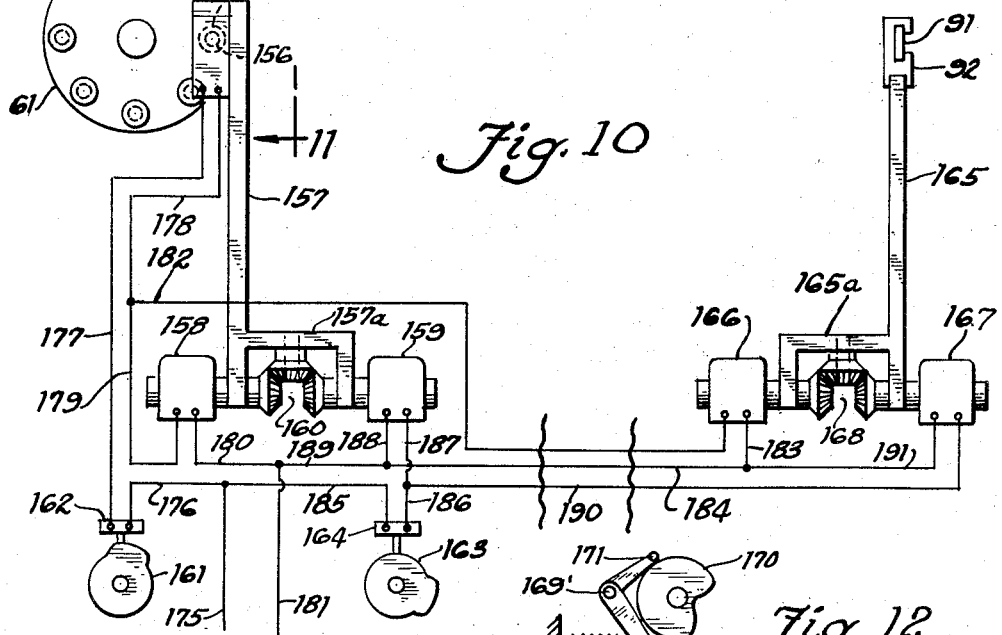
Fig. 11
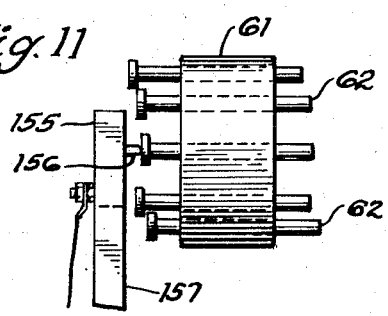
Fig. 12
INVENTOR.
Josephus J. Thayer
BY
Thiess, Olson & Mecklenburger
Attys

UNITED STATES PATENT OFFICE 2,646,270

WEIGHING MACHINE

Josephus J. Thayer, Middlebury, Conn.

Application August 13, 1949, Serial No. 110,131

14 Claims. (Cl. 265—27)

This invention relates to a method and apparatus for automatically compensating for variations in tare weight in the weighing of filled containers or containers which are being filled. It is an object of the invention to provide an improved method and apparatus of that character.

Where a specific weight of commodity is to be placed into a container, one practice is to fill the container until the gross weight equals the prescribed net weight plus a fixed allowance for tare weight. There is commonly an appreciable variation in the tare weight (the weight of the empty container) and, accordingly, in order to be sure of a certain minimum net weight, it is a necessary part of this practice to add the maximum observed tare weight to the desired minimum net weight to determine the gross weight to be used as standard. This results in a substantial excess net weight in most of the filled containers since the weight of most of the containers is less than the maximum.

It is another object of this invention to provide a method and apparatus for automatically determining the tare weight of individual containers and automatically compensating for the actual tare weight during the filling of the container. This permits accurate filling of the individual containers with the prescribed minimum net weight of the commodity.

A problem arises in compensating the gross weight scale for the tare weight of the individual container being filled as a result of the fact that it is frequently desired to perform certain operations on a container between the time that the tare weight is determined and the time that it is filled with the prescribed net weight of commodity. Such steps may be the partial filling of the container and the subjecting of the partially filled container to a vibratory motion in order to settle the commodity and remove air bubbles. The partial filling is commonly done in order that the final filling on the gross weight scale can be accomplished in a short time by a relatively thin stream of the commodity, the relatively thin stream permitting a more accurate filling of the container. In order that the filling machine and the associated weighing apparatus may be used at its maximum efficiency or capacity it is necessary that the tare weight scale be utilized in the meantime to determine the weight of other containers. Accordingly, the tare weight of one or more containers, must be determined and the information stored during the period of time which elapses between the tare weight determination and the final filling of a particular container. This intelligence must be stored in such a way that it does not interfere with subsequent tare weight measurements prior to the final filling of the first container. Even with no intermediate steps between the tare weight measurement and the final filling some means of storing an impression of the tare weight of a container must be provided unless a single container is to pass over both scales prior to the determination of the tare weight of a second container.

In accordance with prior practice, this may be accomplished by providing a plurality of gross weight and tare weight scales. A first container is placed on a tare weight scale which then causes an adjustment of a corresponding gross weight scale to compensate for the tare weight of this first container. These two scales are then taken out of action until such time as that first container is ready for its final filling and weighing. In the meantime, a second and perhaps a third or further containers are placed upon other tare weight scales included in the same machine, each of these tare weight scales causing the adjustment of other corresponding gross weight scales to compensate the latter for the tare weight of the containers supported by the tare weight scales. After a container has been filled and weighed by a gross weight scale, the container is removed and that gross weight scale and its corresponding tare weight scale are available for handling another empty container.

This arrangement has the obvious disadvantage that it is costly to produce because of the substantial number of scales required. According to this invention, only a single tare weight scale and a single gross weight scale are necessary even though it is desired to perform a large number of operations on a container between the time of the tare weight determination and the final filling of the container, this weighing apparatus being adapted to handle any number of containers between the time of the tare weight determination and the final filling of a single container.

In accordance with one embodiment of this invention, a first or tare weight scale is used to weigh, in succession, individual empty containers before they reach the main scale which is used in filling the containers to a predetermined gross weight. A semi-permanent registration is made of the tare weights by a registering means which is responsive to indications given by the first scale. A tare weight compensating device, such as a sliding weight, is associated with the main scale and means are provided for adjusting the compensating device in accordance with the setting of the registering means. A plurality of registering means are preferably employed in order that a registration of the tare weights of one or more containers can be stored, independent of either scale, during a time interval in which the weighed containers may be subjected to intermediate treatments and in which subsequent containers are weighed on the tare weight scale. The entire mechanism is preferably driven in timed sequence in order that the compensating device will be adjusted in accordance with the setting of a certain tare weight registering means at the time that the main scale is weighing the container whose tare weight is registered on the last-mentioned registering means.

According to a preferred embodiment of this invention, the registering means consists of a cylinder with a plurality of rods extending therethrough parallel to the axis thereof. These rods are sequentially positioned with respect to the cylinder in accordance with the position of the tare weight scale, the various actions being timed in such a manner that each rod is so positioned at a time when the tare weight scale is in balanced position indicating the tare weight of a container. The setting of any one rod in the cylinder is then a physical registration of the weight of one particular container. Subsequently, for example, after that particular container has been substantially filled by a preliminary filling means, a linkage mechanism engages one end of that rod and positions a compensating weight on the main scale in accordance with the position of that rod in the cylinder. The sequence of these operations is timed in an obvious manner such that the compensating weight on the main scale is so adjusted at the time that the container whose tare weight is registered on the last-mentioned rod is on the main scale. An additional quantity of the commodity is then added to that container while on the main scale until a gross weight is reached, as indicated by the balancing of that scale, which equals the desired net weight plus the tare weight of the container being filled. Accordingly, if a particular container being filled happens to be relatively light, the movement of the compensating weight will be in such a direction as to cause the filled container to have a relatively light gross weight. Similarly, if the individual container being filled happens to be relatively heavy, the compensating weight will be moved in the other direction with the result that the container will be filled to a relatively heavy gross weight.

The cylinder and rods mentioned above cooperate with the tare weight scale and the main scale and are made to operate in a planned sequence therewith but they are otherwise independent of the two scales. Accordingly, an empty container may be weighed on the tare weight scale and a single rod be set thereby in the cylinder, and this physical registering of the tare weight can be stored for as many cycles of container weighings as is desired and until the first container reaches the main scale. At that time, of course, the rod which has been set in accordance with the weight of that container comes into position to cause the adjustment of the compensating weight through the means of the adjusting linkage. The container, after being weighed in its empty condition, can, for example, be partially filled and packed down by ramming or jiggling, and then transported to the main weighing scale. During that interval, one or more additional empty containers may be weighed by the tare weight scale and their weights registered by successive rods in the cylinder. According to this arrangement the tare weight scale and the gross weight scale can be kept busy at all times and it is not necessary to employ a plurality of gross weight scales which have been previously conditioned by the weighing thereon of the empty container. In other words, according to this invention the tare weights of the individual containers are registered and stored by a registering device which has the capacity to retain such registrations during subsequent operations of both the tare weight scale and the gross weight scale and, subsequently, to adjust the gross weight scale in accordance with the registered impression of the previously weighed empty container.

Accordingly, it is another object of the invention to provide an improved method and apparatus for adjusting a weighing scale to compensate for the tare weight of an individual container being weighed in its filled condition.

It is another object of the invention to provide an improved method and apparatus for storing impressions of tare weights of containers, independently of any tare weight scale or gross weight scale, and subsequently adjusting the gross weight scale to compensate for the tare weight of a particular container being weighed thereon.

It is another object of the invention to provide an improved method and apparatus for compensating for the tare weight of individual containers whereby only a single tare weight scale and a single gross weight scale need be employed even though one or more empty containers are weighed on the tare weight scale during the interval between the weighings of an individual container on the two scales.

It is another object of the invention to provide an improved method and apparatus for controlling the net weight of a container wherein a physical impression of the tare weight of a container is registered and is stored during the weighing of one or more additional empty containers and filled containers, the physical impression of the tare weight of the first container registered and stored subsequently controlling the adjustment of a gross weight scale to compensate for the tare weight of that particular container.

The invention, together with further objects and advantages thereof, will best be understood by reference to the following description taken in connection with the accompanying drawings, and its scope will be pointed out in the appended claims.

In the drawings, in which like parts are indicated by like reference numerals:

Fig. 7 is a cross-sectional view of the same machine taken along the line 7—7 of Fig. 4, certain parts being omitted for clarity;

Fig. 8 is a cross-sectional view of the same machine taken along the line 8—8 of Fig. 4;

Fig. 9 is a detail plan view of the scale beam and associated apparatus for the main scale, taken along the line 9—9 of Fig. 3;

Fig. 10 is an elevational view and diagram illustrating another embodiment of the invention;

Figs. 11 and 12 are fragmentary views of apparatus shown in Fig. 10.

Figure 1:
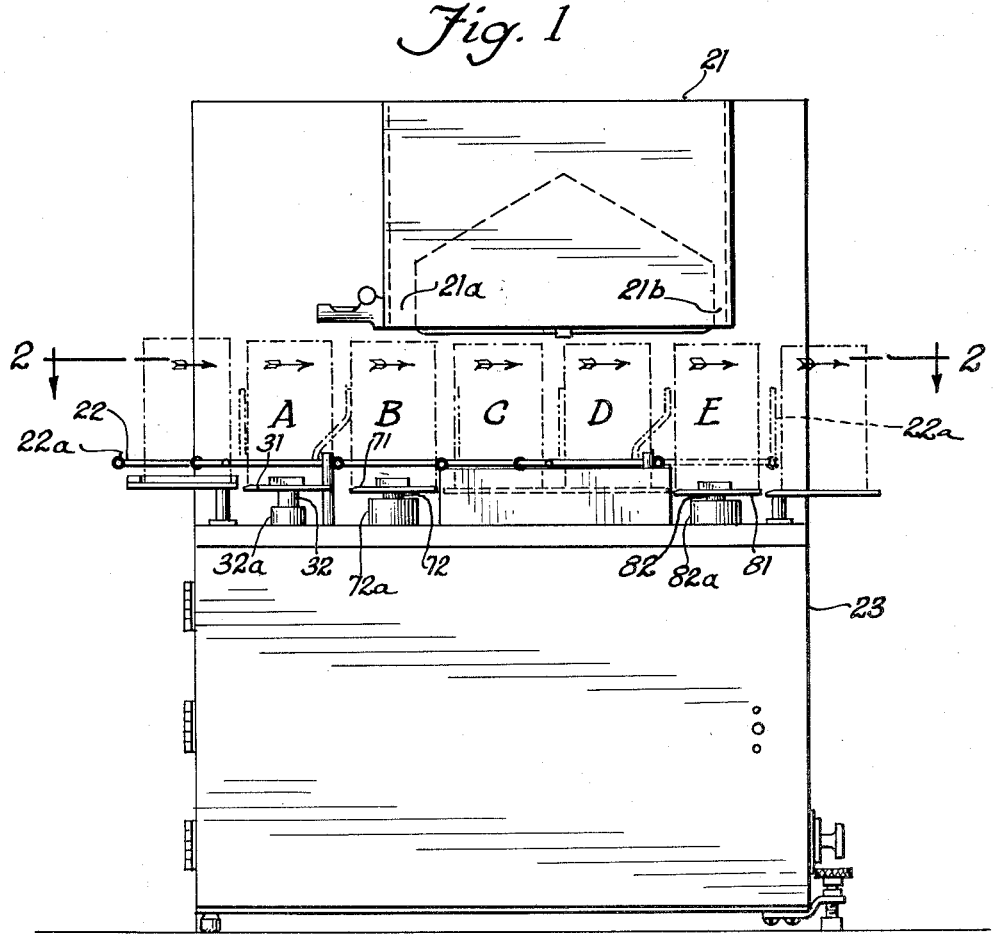
Fig. 1 is an elevational view of a container filling apparatus showing primarily the various scale pans and the apparatus for feeding containers through the machine.

The embodiments of the invention shown in the drawings include a tank 21 containing the commodity with which the containers are to be filled, apparatus including sliding rack 22 for moving containers through the machine, and a weighing machine 23, which determines the weight of the individual empty containers, registers this information and stores it on apparatus independent of any scales, and subsequently utilizes this information to compensate for the tare weight in determination of the proper gross weight during the final stage of the filling of the containers. The apparatus for filling the containers is not shown in detail as this does not form a part of the invention. Specifically, certain valves and controls for the same are located at points designated 21a and 21b, the valve and controls at 21a being arranged to permit a sub-minimum quantity of the commodity to enter containers thereunder and the valve and controls at 21b being adapted to emit a relatively small stream of the commodity for filling the container to a predetermined net weight, both valves being controlled by the weighing apparatus 23.

Figure 2:
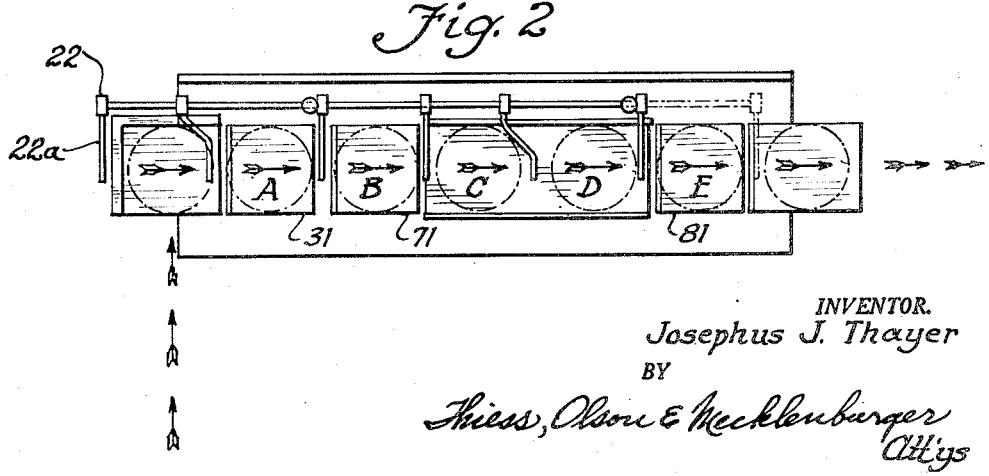
Fig. 2 is a cross-sectional view of the same machine taken along the line 2—2 of Fig. 1.

Empty containers are fed to the machine as indicated in Fig. 2 and are then fed from left to right through the machine, as indicated in Figs. 1 and 2, by a plurality of rack fingers 22a connected to the rack 22. The sliding rack is driven by apparatus, not shown, such that it moves from the left-hand position shown in solid lines in Fig. 2 to the right-hand or advanced position indicated by the dotted lines in Fig. 2, the fingers 22a thereby driving each container on the machine to the position previously occupied by the container immediately ahead of it. The fingers are then raised to the positions indicated by the dotted lines in Fig. 1 and are moved to the left or rearwardly after which they drop down to their original horizontal position where they are in readiness to again drive the containers forwardly or to the right. The containers, accordingly, advance in steps and as will be subsequently described, certain operations are performed at each step, the last of which is the filling of the container with a predetermined minimum weight of the commodity contained in the tank 21 as determined by the gross weight of the container.

The various positions at which the containers remain momentarily stationary within the machine are indicated by the containers shown in dotted outline in Figs. 1 and 2, and designated by the letters A, B, C, D and E.

Figure 3:
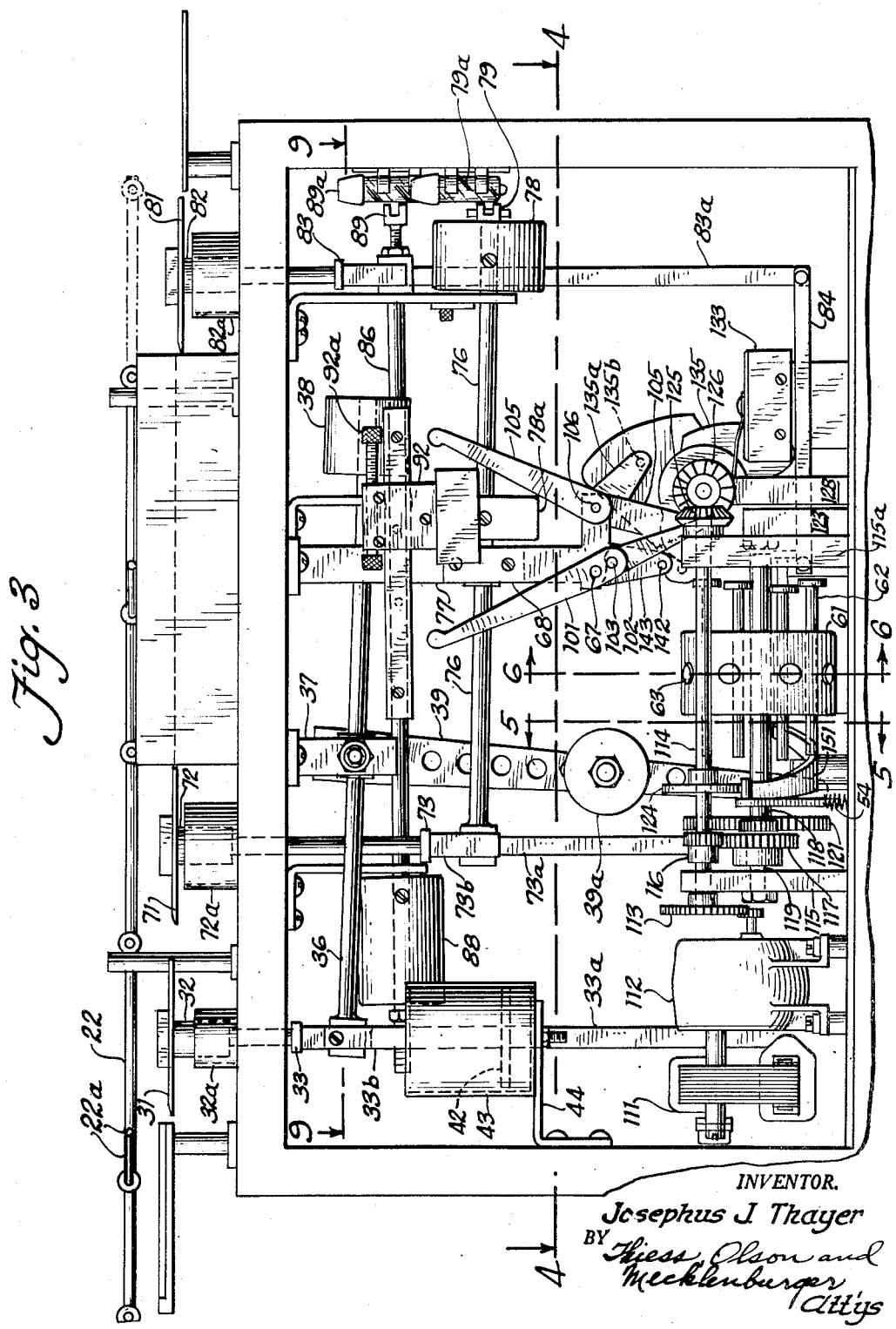
Fig. 3 is an interior elevational view of the same machine showing the weighing apparatus.

The first operation is performed upon the containers when they reach the position designated by the letter A. In this position the container rests upon a scale pan 31 supported by a vertical shaft 32 which is in turn guided by a guide collar 32a, as is best seen in Fig. 3. Shaft 32 is connected to a rigid fork 33, the rearward prong 33a of the fork extending downwardly to a point near the bottom of the machine as may be seen in Figs. 3 and 7. The lower end of prong 33a is pivotally connected to a horizontal bar 34 which is in turn pivotally connected to a bracket 35, the bar 34 serving merely to hold prong 33a in substantially vertical alignment.

Between the rearward prong 33a and the forward prong 33b of the fork 33 a crossbeam 36 is pivotally connected. The crossbeam is pivotally supported by a pair of fixed brackets 37 and a weight 38 is adjustably connected to the right-hand end of the crossbeam to balance substantially the weight of the fork 33, the shaft 32, the scale pan 31, and an empty container of average weight supported thereby.

A pendulum 39 having a weight 39a adjustably connected thereto is rigidly connected to the crossbeam 36, the pendulum 39 tending to hang in the vertical position and to maintain the crossbeam 36 in its horizontal position. It will be apparent to those skilled in the art that variations in the weight of containers positioned on the scale pan 31 will cause the pendulum 39 to swing to the right or left in Figs. 3 and 7, a heavy container causing the pendulum to swing to the right while a light container will permit the pendulum to be moved to the left by the weight 38.

A plunger device is connected to the tare weight scale for damping oscillations naturally resulting from the placing thereon of an empty container. A piston 42 is connected to the forward prong 33b of fork 33, which piston is slidably movable in a hollow cylinder 43 mounted on a bracket 44. The cylinder is partially filled with a damping fluid such as oil and, accordingly, any vertical movement of piston 42, and hence of the tare weight scale, is accompanied by a leakage of oil past the piston. This causes damping of the movement of the tare weight scale, with the result that the scale will quickly position itself at the proper point of balance. A variable opening may be provided in the face of the piston 42 in accordance with practice well known in the art, in order that the damping action may be adjustable.

Figure 5:
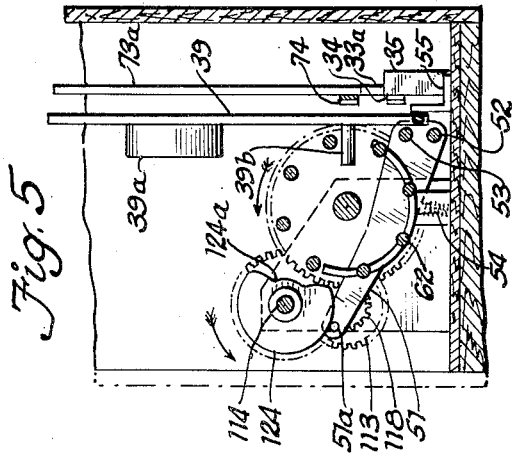
Fig. 5 is a cross-sectional view of the same machine taken along the line 5—5 of Fig. 3.

Means are provided, as best seen in Fig. 5, for clamping the pendulum 39 in its balanced position. A lever 51 is pivotally mounted on a fixed shaft 52, and has rigidly mounted thereon a pin 53 which, when the lever 51 is in its lower position, is spaced a short distance from the forward face of the pendulum 39. When the lever pivots upwardly, as under the influence of a spring 54, the pin 53 bears against the forward face of the pendulum, the pendulum thereby being clamped securely between the pin 53 and a fixed bracket 55 located immediately to the rear of the pendulum.

The pendulum is so locked in its balanced position in order that a registration may be made of the tare weight indicated by the position of the pendulum. The registering device consists primarily of a cylinder 61 having a plurality of pins 62 extending through axial openings in the cylinder. A lock is provided for each pin, as may be best seen in Fig. 6. A series of plugs 63 are slidably mounted in radial openings in the cylinder 61, the plugs being urged outward by springs 64.

The axial openings in the cylinder through which the pins 62 extend are aligned with the plugs 63, and the plugs have openings therethrough in alignment with the axial openings in the cylinder to receive the rods 62. The springs 64 urge the plugs 63, and hence the pins 62, outward, whereby a frictional lock is obtained holding the pins securely in any given position with respect to the cylinder 61.

A fixed cam 65 is provided for forcing any plug in contact therewith inward, against the action of the corresponding spring 64, to release the friction lock of the associated pin 62. That rod is then free to be driven by a lever 66, as best seen in Fig. 8, to the left until the left-hand end of the pin strikes a forwardly extending protrusion 39b on the pendulum 39, each rod having an enlarged head at its right-hand end to insure proper contacting of the lever 66 therewith. The positioning of this pin 62 with respect to cylinder 61, in accordance with the position of pendulum 39, forms a semi-permanent registration of the tare weight of the container being weighed, this registration of the container weight being stored, independent of the scale, for subsequent use.

Figure 4:
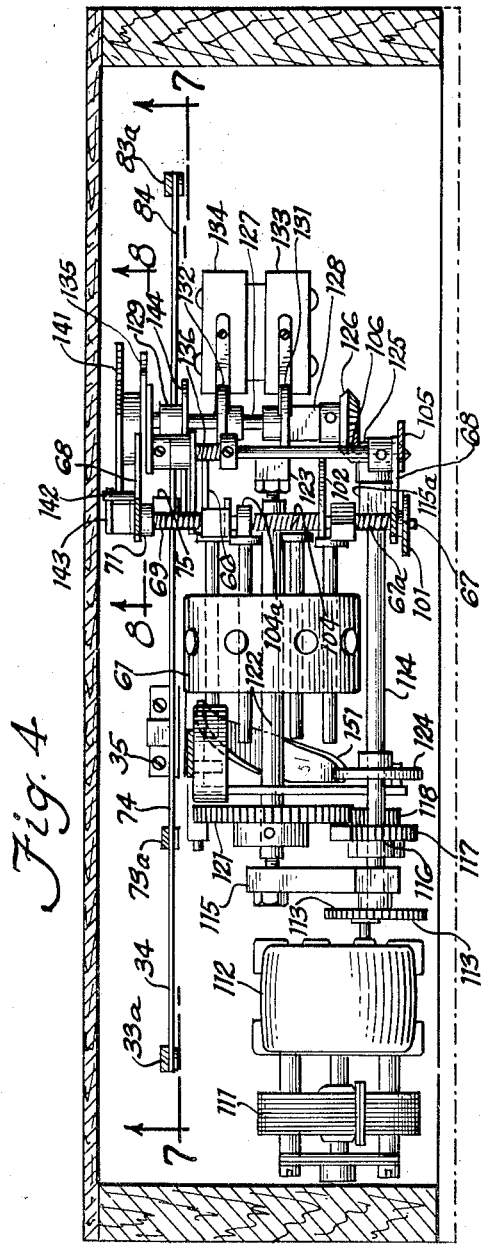
Fig. 4 is a cross-sectional view of the same machine taken along the line 4—4 of Fig. 3.

The lever 66, which causes the movement of the pins 62 toward the left, is pivotally mounted on a shaft 67, which is in turn pivotally mounted on fixed brackets 68, as may be seen in Fig. 4. The lever 66 is resiliently driven by the shaft 67 through a coil spring 69, one end of which is secured to a collar 71, which in turn is secured to the shaft. The other end of spring 69 is secured to the lever 66, whereby movement of the shaft in a clockwise direction, as seen in Fig. 8, urges lever 66 resiliently to the left. Accordingly, when the pin 62, being driven to the left by lever 66, strikes the forwardly extending protrusion 39b, movement of the pin and the lever ceases since the force of the spring 69 is not sufficient to cause the pendulum to move from its clamped position.

The second operation is performed on a container when it reaches the position designated by the latter B in Figs. 1 and 2. At this point a sub-minimum quantity of the commodity is permitted to enter the container, the amount being controlled through a scale upon which the container rests. A scale pan 71 is provided, see Fig. 3, which is supported by a vertical shaft 72 guided by a guide collar 72a. Shaft 72 is connected to a rigid fork 73, the rearward prong 73a of the fork extending downwardly to a point near the bottom of the machine as may be seen in Figs. 3 and 7. The lower end of prong 73a is pivotally connected to a horizontal bar 74 which is in turn pivotally connected to a fixed bracket 75, the bar 74 serving merely to hold prong 73a in substantially vertical alignment.

Between the rearward prong 73a and the forward prong 73b of the fork 73, a crossbeam 76 is pivotally connected, the crossbeam being pivotally supported by a pair of fixed brackets 77. Weights 78 and 78a are adjustably mounted on the right-hand end of the crossbeam 76 to balance substantially the weight of the fork 73, the shaft 72, the scale pan 71, and any container supported thereby having approximately the desired sub-minimum amount of the commodity contained therein.

When the desired sub-minimum quantity of a commodity has been permitted to enter the container, the weight thereof causes the right-hand end of crossbeam 76 to rise and a magnet 79 mounted at the right-hand end of the beam causes a magnetically controlled switch 79a to operate, the switch in turn closing the valve located at position 21a. The circuit for closing the valve is not shown as it may be conventional in arrangement.

The next two operational positions designated C and D in Figs. 1 and 2 are identical in function, the platform upon which the containers rest in these positions having a vibratory motion to settle the commodity in the container and to remove any air bubbles which may be entrapped. This step and the partial filling of the container at position B are merely indicative of the various intervening processes to which the containers or the partially filled containers may be subjected between the tare weight measurement at position A and the final filling of the container at position E, a registration of the tare weight measurement being stored in the interim independently of either scale.

At the final position designated E in Figs. 1 and 2, a stream of the commodity is permitted to enter the container until the gross weight of the container has reached a figure which corresponds to the proper net weight, the tare weight of the individual container being taken into consideration in this operation. In this position, the container rests upon a scale pan 81, see Fig. 3, which is in turn supported by a vertical shaft 82 guided by a guide collar 82a. The vertical shaft 82 is connected to a rigid fork 83, the rearward prong 83a of the fork extending downward to a point near the bottom of the machine as may be seen in Figs. 3 and 7. The lower end of prong 83a is pivotally connected to a horizontal bar 84 which is in turn pivotally connected to the bracket 75, the bar 84 serving merely to hold the prong 83a in substantially vertical alignment.

Between the rearward prong 83a and the forward prong 83b of the fork 83, a crossbeam 86 is pivotally connected. The crossbeam is pivotally supported by the fixed brackets 77, a weight 88 being adjustably connected to the left-hand end of the crossbeam 86 to balance the weight of the fork 83, the shaft 82, scale pan 81, and any container supported thereby containing substantially the proper quantity of the commodity.

Connected to the right-hand end of the crossbeam 86 is a magnet 89 acting in cooperation with a magnetically controlled switch 89a. When the proper quantity of the commodity has been permitted to enter the container on the scale pan 81, the right-hand end of the crossbeam 86 moves downward and the magnet 89 actuates the switch 89a and causes the closing of the valve located at position 21b. The circuit for closing the valve is not shown since it may be of any conventional arrangement.

In Fig. 9, it may be seen that the crossbeam 86 is made up of two portions, each of which is securely connected to a shaft 86a which is in turn pivotally supported by fixed brackets 77. This construction is one of convenience only and does not form a part of the invention. In the same figure, there may be seen a rail 91 for supporting a sliding weight 92, the rail being rigidly supported on the shaft 86 by means of pins 93, a yoke 94, and a collar 95.

The weight 92 is a tare weight compensating device which is moved along the rail 91 in accordance with the setting of the proper rod 62 in the cylinder 61. Since the container being filled is supported by the right-hand end of the crossbeam 86, it will be apparent that if the compensating weight 92 is moved to the right in Figs. 3 and 9, a lesser gross weight will be obtained before the flow of the commodity is cut off by the action of switch 89a. Accordingly, the slide weight 92 is moved to the right in the event that the particular container being filled at position E is relatively light in weight. Similarly, if the container being filled is heavier than normal, the slide weight is moved to the left resulting in a greater gross weight of the filled container whereby the desired net weight is obtained in spite of the greater weight of the container being filled. A pair of adjusting screws 92a are threadedly mounted in the compensating weight 92 with the result that the effect of the compensating weight may be adjusted in an obvious manner.

The mechanism for controlling the position of the compensating weight 92 includes a lever 101 which is pivotally mounted on shaft 67. A second lever 102 is also pivotally mounted on shaft 67 and the two levers are rigidly connected by a pin 103 whereby these two levers act in unison or as a single compound lever. A helical spring 104 concentric with the shaft 67 has one end secured to the shaft through a collar 104a. The other end of the spring 104 is connected to the lever 102 and urges the two levers 101 and 102 in a clockwise direction, as viewed in Fig. 3.

The upper end of the lever 101 is adapted to engage the left-hand surface of the compensating weight 92 and force it to the right, as seen in Figs. 3 and 9. The clockwise movement of the lever 102 and hence of the lever 101 is limited by the engagement of the lower end of the lever 102 with the enlarged right-hand end of a rod 62. Accordingly, the movement of the compensating weight to the right is limited by the setting of a selected rod 62 in cylinder 61.

Prior to the actuation of levers 101 and 102 by the shaft 67 to move the compensating weight to the right, this weight is moved to the left by a lever 105 in order that the weight may be in a position to be actuated by the lever 101, it being apparent that if it is desired to move the weight to the left to compensate for a container heavier in weight than the one previously filled, the arm 102 would otherwise be incapable of adjusting the weight since it is able to move the weight to the right only.

The lever 105 is rigidly secured to a shaft 106 which is rotatably mounted in the fixed brackets 68. The shaft 106 causes a predetermined counterclockwise movement of the lever 105 which moves the compensating weight 92 to the left on rail 91 to a position corresponding to at least the heaviest container to be filled. This makes it possible for the lever 101 to move the compensating weight back to the right to the proper position corresponding to the container next to be filled as determined by the setting of the proper rod 62.

Figure 6:
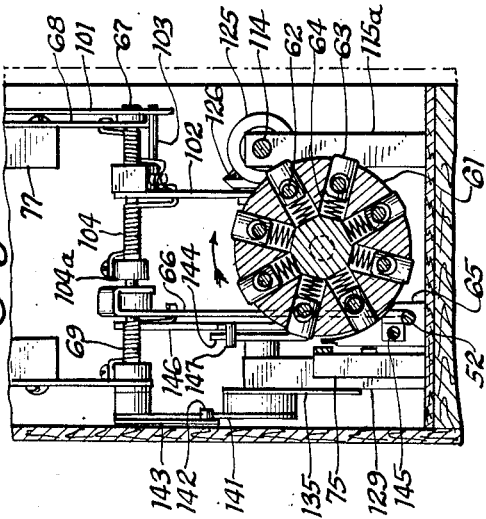
Fig. 6 is a cross-sectional view of the same machine taken along the line 6—6 of Fig. 3.

The various parts of the weighing mechanism 23 are preferably driven by a single source of power through interlocked gear trains in order that the entire mechanism is locked in unvarying sequence. A motor 111 is provided for this purpose which drives a reduction gear train 112, as is best seen in Figs. 3 and 4. A further reduction in speed is obtained by gears 113 which drive a main power shaft 114 mounted on fixed brackets 115 and 115a. A double reduction gear train is provided for driving the cylinder 61, the first pinion 116 of this train being mounted on the main power shaft 114. This pinion drives a gear 117 and a pinion 118, both of which are mounted on a shaft 119 which is rotatably supported by fixed bracket 115. The pinion 118 drives a gear 121 which is secured to a shaft 122 which is in turn rotatably supported at one end by bracket 115 and at its other end by a fixed bracket 123. Since both the gear 121 and the cylinder 61 are secured to this shaft, the cylinder 61 is thereby driven at a relatively low speed in the clockwise direction, as seen in Fig. 6, or in the counterclockwise direction, as seen in Fig. 5.

Also connected to the main shaft 114 is a cam 124 which operates against a pin 51a at the forward end of lever 51, as may be seen best in Figs. 4 and 5. When the circular portion of cam 24 forces the pin 51a and the lever downward, the pin 53 is withdrawn from contact with the pendulum 39 and the tare weight scale is free to move. However, when the pin 51a is permitted to move upward into the recessed portion 124a of the cam 124, the spring 54 forces the lever 51 upward and pin 53 forcibly engages the lower end of pendulum 39 locking it in position as previously described.

At the right-hand end of the main shaft 114 is a bevel gear 125 meshing with a second bevel gear 126 which is secured to a shaft 127 rotatably supported by fixed brackets 128 and 129. A pair of cams 131 and 132 are shown connected to the shaft 127 for operating electric switches 133 and 134. These switches may be used to operate the valves located at positions 21a and 21b for starting the flow of the commodity in the positions B and E. As previously explained, these circuits and the valves may be conventional, and, accordingly, in the interest of simplification, are not shown in the drawings.

A cam 135 is secured to the shaft 127 near its rearward extremity for controlling the operation of lever 105, see Figs. 3, 4 and 8. An arm 135a is secured to the shaft 106 and has a pin 135b near its outer extremity for engaging cam 135. When the radially outward portions of the cam 135 engage the pin 135b, the arm 135a, and, accordingly, the lever 105 are moved in the counterclockwise direction, as seen in Figs. 3 and 8, whereby the compensating weight 92 is moved to the left on rack 91. A spring 136 operates to urge shaft 106, lever 105 and arm 135a in the clockwise direction, thereby withdrawing the lever 105 when the recessed portions of the cam 135 face the pin 135b. A stop pin 68a is provided on the rearward bracket 68 to limit the clockwise movement of the shaft 106 and the associated parts.

Another cam 141 is secured to the shaft 127 adjacent its rearwardmost end, this cam engaging a pin 142 connected to an arm 143 which is secured to shaft 67. When the outer portions of the cam 141 contact the pin 142, as shown by the dotted lines in Fig. 8, the arm 143 is moved in a clockwise direction as seen in Figs. 3 and 8, this in turn causing the clockwise movement of shaft 67 against the action of a spring 67a at the forward end thereof. This movement of the shaft 67 causes lever 66 to drive a pin 62 to the left in cylinder 61 until that pin engages pin 39b on the locked pendulum 39, as previously described. The clockwise movement of shaft 67 also operates levers 101 and 102 to set the compensating weight 92 in accordance with the setting of a rod 62, as previously described.

A third cam 144 is mounted on shaft 127, the purpose of this cam being to drive the pendulum 39 to the left and thereby to raise the scale pan 31 at the end of a tare weight determining operation in order that the empty container in position A may be slid to position B by the rack fingers 22a. This movement of the pendulum 39 is effected by a rod 145, see Fig. 7, which is slidably supported by the fixed cam 65. The left-hand end of rod 145 is adapted to engage one side of the lower end of the pendulum while the right-hand end of the rod is pivotally connected to the lower end of arm 146, which in turn is pivotally supported by the shaft 106. The arm 146 has a pin 147 adapted to be engaged by the cam 144. When the raised portions of this cam strike the pin 147, as shown by the dotted lines in Fig. 7, the arm 146 and hence the rod 145 are moved to the left, thereby moving the pendulum and raising the scale pan 31. When the lower portions of the cam 144 contact the pin 147, as shown by the solid lines in Fig. 7, the arm 146 and hence the rod 145 are withdrawn to the right by the coil spring 136.

A stationary cam 151 is provided for driving the rods 62 toward the right within cylinder 61 as the rods approach the pendulum 39, as may be seen in Figs. 3, 4 and 5. This is done in order that the rods will not interfere with the swinging motion of the pendulum 39 during the weighing of an empty container and in order that the rods may subsequently be forced to the left by lever 66 into engagement with the clamped pendulum.

The operation of the individual parts of the machine having been explained above, a complete operation of the entire machine will now be described in order that the sequence of operation and the interaction of the various parts may be clearly understood.

Empty containers are fed to the machine by any suitable form of conveying apparatus, not shown in the drawings. The rack 22 operates in the manner previously described to move the first of these containers to the position designated by the letter A in Figs. 1 and 2. The driving mechanism for the rack, which is not shown in the drawings, should be geared or otherwise synchronized with the driving mechanism for the weighing machine in order that the containers will be advanced to the various positions in the machine as soon as but not before the weighing machine has performed the various functions prescribed in connection with these positions.

When a first container is thus placed upon the scale pan 31, it causes the pendulum 39 to swing to the right a distance corresponding to the tare weight of that container, the damping mechanism 42—43 reducing oscillation with the result that the tare weight scale quickly assumes a balanced position.

The weighing machine power system, which comprises the motor 111, the gear train 112, and the various other gears and shafts for actuating the numerous cams, levers, and other working parts of the weighing machine, then rotates cam 124, see Fig. 5, to permit the raising of the lever 51 and the locking of the pendulum in its balanced position. Next, the cam 141 actuates lever 66, see Fig. 8, to drive a rod 62 axially with respect to cylinder 61 until the left-hand end of the rod strikes the forwardly extending protrusion 39b on the locked pendulum. During this movement of the rod 62, the friction lock normally affected by the associated plug 63 and spring 64 will be deactuated by the cam 65, as may be seen in Fig. 6.

The cam 124 now forces the lever 51 to pivot downward releasing the pendulum 39 and the cam 144 moves the lever 146 to the left, see Fig. 7, causing the rod 145 to strike the lower end of the pendulum and move it to the left thereby raising scale pan 31 with the result that the container supported thereby is in position to be slid forward to position B.

An impression now having been registered of the tare weight of the first container, the rack now moves the first container to position B and moves a second container to position A. While in position B and during the weighing of the second container now in position A, the first container is partially filled to a predetermined sub-minimum net weight of the commodity contained in the tank 21.

A valve and control mechanism located at position 21a, but not shown in the drawings, is actuated in synchronism with the rest of the machine by conventional means to start the flow of the commodity into the first container. When a gross weight has been reached, corresponding approximately to the desired sub-minimum net weight, the scale beam 76 tilts and the magnetic switch 79a is energized to stop the flow of the commodity.

While this operation is taking place, the second container is being weighed in the same manner as the first container was previously weighed with the exception that the cylinder 61 has been rotated the proper number of degrees by the gears 116, 117, 118 and 121 such that a second rod 62 is in position to register the weight of the second container, the first rod previously set in accordance with the weight of the first container having moved out of the path of the lever 66 and having been locked in position by the corresponding plug and spring 63 and 64, respectively.

The rack 22 now forces the first container into position C, the second container in position B, and a third container in position A. The pendulum 39 again assumes a position of balance corresponding to the weight of the third container and is locked in position, and the cylinder 61 is rotated the proper distance to bring a third rod into position to be set in accordance with the position of the pendulum. At the same time, the second container now in position B is filled to a predetermined sub-minimum gross weight as described immediately above in connection with the first container. During the same period in which these simultaneous operations are being performed, the first container, now located in position C, is subjected to a vibratory motion to settle the commodity in the container and to remove any air bubbles which may be included therein.

The rack 22 then moves the first, second and third containers into positions D, C and B respectively, and moves a fourth container into position A. The cycle is then repeated with the first container, in position D, being subjected to continued vibratory motion to further settle the commodity and more completely remove any entrapped air bubbles. At the completion of this fourth cycle, it will be apparent that four containers have been weighed by the tare weight scale and an impression of their tare weights registered by four rods 62 in the cylinder 61.

The first four containers are now moved to positions E, D, C and B, while a fifth container is moved to position A on the tare weight scale. While the tare weight scale and various associated parts of the weighing machine are cooperating to obtain a fifth tare weight registration, the first tare weight impression in the form of the first rod 62 is utilized in the adjustment of the gross weight scale to compensate for the tare weight of the first container during the final filling thereof. The lever 105 is actuated by cam 135, see Fig. 8, to move the compensating weight 92 to the left in Fig. 9 in order that this weight will be in a position to be adjusted subsequently in accordance with the setting of the first rod 62.

The cam 141 then causes the rotation of shaft 67, see Fig. 8, the rotation of this shaft in turn causing the rotation of the compound lever 101—102. The lever 102 advances clockwise until it strikes the right-hand end of the first rod 62 and the lever 101, being rigidly connected to the lever 102 follows in a clockwise direction and forces the sliding weight 92 to the right a distance determined by the setting of the rod 62 being engaged by the lever 102. A small stream of the commodity contained in the tank 21 is then permitted to enter the first container through a valve in position 21B until such time as the now-compensated gross weight scale tilts and causes the actuation of magnetic switch 89a which closes the last-mentioned valve.

In Figs. 1 through 9, an embodiment of the invention has been shown in which operating positions A and E are relatively close together and, accordingly, it is a simple matter to transmit the necessary physical forces from the tare weight scale to the gross weight scale. Under certain circumstances, it may be desired that these two stations be widely spaced, in which case it is preferable that intelligence be transmitted electrically from the tare weight scale to the gross weight scale. Apparatus for accomplishing this is illustrated in Figs. 10, 11 and 12.

A switch 155 is provided for feeling the position of one of the rods 62 of the cylinder 61, as may be seen in Figs. 10 and 11. The switch has a plunger 156 which opens the contacts of the switch when depressed by movement of the switch against one end of a rod 62.

The switch is mounted on a pivotable arm 157 which is divided at its lower end to form a yoke 157a. This arm and switch are operated by a pair of motors 158 and 159 through a differential mechanism 160. A cam 161 is arranged to actuate a switch 162 for controlling the motor 158 and another cam 163 is arranged to operate a switch 164 for controlling the motor 159. All of the apparatus described immediately above is preferably located in the vicinity of the tare weight scale.

Adjacent the gross weight scale is an arm 165 for controlling the position of the compensating weight 92 on the rail 91, as may be seen in Figs. 10 and 12. The arm 165 is similar in construction to the arm 157 and has a divided portion at its lower end to form a yoke 165a. This arm is controlled by a pair of motors 166 and 167 through a differential mechanism 168, these motors being interconnected with the motors 158 and 159. As will subsequently be described in detail, the arm 165 is caused to follow the movements of the arm 157, and, accordingly, positions the compensating weight 92 in accordance with the setting of the particular rod 62 with which the switch plunger 156 is brought into contact.

As in the case of the embodiment of the invention shown in Figs. 1 through 9, the actuating arm 165 is capable of moving the compensating weight 92 in one direction only. Accordingly, an arm 169 is provided for moving the compensating weight in the opposite direction. The arm 169 pivots about a fixed pin 169' and is operated by a cam 170 in cooperation with a pin 171 mounted at one end of the arm 169. A spring 172 urges the arm 169 to the left and maintains the pin 171 in contact with cam 170.

A single operation of the apparatus shown in Figs. 10, 11 and 12 will now be described.

At the conclusion of one operation of the gross weight scale, the cam 170 reaches a position in which the pin 171 falls into the recessed portion of the cam under the influence of the spring 172. The arm 169 then forces the compensating weight 92 to the left as viewed in Fig. 12. Further rotation of the cam 170 raises the pin 171 and causes the withdrawal of the arm 169.

The cam 161 then closes the contacts of the switch 162. This closes a circuit for energizing the motors 158 and 166 which will now be traced. Current enters a power lead 175 and passes to the switch 162 through a conductor 176. The current passes through the closed contacts of the switch 162, through a conductor 177, through the closed contacts of the switch 155 and through conductors 178 and 179 to one terminal of the motor 158. The other terminal of this motor is connected by a conductor 180 to another power lead 181.

The circuit for the motor 166 also includes the switches 162 and 155. However, the current passes from the conductor 178 through a conductor 182 to one terminal of the motor 166. The other terminal of this motor is connected by conductors 183 and 184 to the power lead 181.

The motors 158 and 166 cause the arms 157 and 165 to rotate in the clockwise direction as viewed in Figs. 11 and 12. The motors are preferably of the synchronous type in order that they will rotate at the same speed whereby the two arms 157 and 165 will always assume corresponding positions. The motors 159 and 167 are at this time deenergized, and it will be understood that they are restrained against rotation by any conventional means well known in the art in order that the motors 158 and 166 may drive the corresponding arms 157 and 165 through the respective differential mechanisms.

The clockwise rotation of the two arms is interrupted when the switch plunger 156 strikes a rod 62 and causes the contacts of the switch 155 to open. This interrupts the flow of power to the motors 158 and 166 since, as previously described, the switch 155 is located in series arrangement with both of these motors. It will be apparent that the compensating weight 92 has now been moved by the arm 165 to a portion corresponding to the setting of a particular rod 62.

After a suitable time delay to assure adequate time for the maximum operation of the motors 158 and 166, the cam 161 reaches a position in which the switch 162 is no longer actuated. This breaks the power circuits to the motors 158 and 166 regardless of the condition of the contacts of the switch 155.

The cam 163 now closes the contacts of the switch 164 establishing the flow of power to the motors 159 and 167 through circuits which will now be described. Current from the power lead 175 passes through a conductor 185, through the switch 164 and conductors 186 and 187 to one terminal of the motor 159. The other terminal of this motor is connected by conductors 188 and 189 to the other power lead 181. After passing through the switch 164 and the conductor 186, the current may also pass through a conductor 190 to one terminal of the motor 167. The other terminal of this motor is connected to the power lead 181 through a conductor 191 and the conductors 184 and 189. The rotation of the motors 159 and 167 causes counterclockwise movement of the arms 157 and 165 and continues until such time as the cam 163 permits the opening of the contacts of the switch 164, at which time a complete cycle of the gross weight scale adjusting apparatus is completed. A limit switch or switches may be provided to determine the counterclockwise rotation of the arms 157 and 165, the desirability of such control means depending upon particular circumstances.

Various embodiments of this invention having thus been described it will be immediately apparent to those skilled in the art that the invention represents a substantial advance in the art of compensating for tare weight of individual containers in the filling thereof in order to obtain a gross weight corresponding to the desired net weight in spite of variation in tare weight between various containers. One of the principal features of this invention is the provision of means for registering a plurality of tare weights and storing impressions thereof independent of any tare weight scale or gross weight scale, means being provided for adjusting a gross weight scale in accordance with such impressions to compensate for the tare weight of a specific container when that container is being filled. This arrangement permits a complete filling unit to be made up of only one tare weight scale and one gross weight scale and at the same time permits intermediate operations to be performed on the containers between weighings.

It will also be readily apparent to those skilled in the art that the embodiments shown and described above are subject to many and substantial modifications which come within the scope of the invention. The registering and storing means can, for example, assume an infinite number of forms for storing physical impressions of tare weights and can readily be modified to store electrical or hydraulic impressions. Also the actual compensating means associated with the main scale may involve a shifting of the magnetic switch 89a, or a substitute therefor, in place of shifting the movable weight 92 on the main scale. These suggested modifications are merely typical of numerous modifications, all of which would embody the aforesaid feature of the invention which is the registering and storing of an impression of a plurality of tare weights independent of any scale for subsequent use in modifying the performance of the gross weight scale to compensate for the tare weight of the container being filled.

While particular embodiments of the invention have been shown, it will be understood, of course, that the invention is not limited thereto since many modifications may be made, and it is, therefore, contemplated to cover by the appended claims any such modifications as fall within the true spirit and scope of the invention.

The invention having thus been described, what is claimed and desired to be secured by Letters Patent is:

1. In a machine of the class described, first scale means for determining the weight of successive empty containers, second scale means for weighing filled containers, said second scale means being adjustable to compensate for the individual tare weights of successive ones of said containers, and control means responsive to said first scale means for automatically receiving and retaining separate impressions of the tare weights of a plurality of said containers, said control means automatically adjusting said second scale means in accordance with the impression of the tare weight of a given container when the gross weight of said container is next to be controlled by said second scale means.

2. In a machine of the class described, means for registering mechanical impressions of the tare weights of a plurality of containers and for storing such impressions independently of any scale, said means having a base portion and a plurality of rods slidably mounted therein, actuating means for sliding said rods in said base portion to positions determined by a tare weight indicating device, an adjustable tare weight compensating device for association with a gross weight scale, and means successively responsive to the position of said rods for adjusting said compensating device in accordance with the respective positions of said rods to compensate such gross weight scale for the tare weight of containers being weighed thereby.

3. In a weighing machine, a first scale for weighing filled containers, and means for controlling said scale to compensate for variations in tare weight between such containers, said means comprising, a second scale for weighing empty containers, a plurality of registering means responsive to and successively settable in accordance with the position of a weight indicating portion of said second scale in successive weighings of such empty containers, an adjustable tare weight compensating device associated with said first scale, and means for adjusting said device, said last-named means being successively responsive to settings of said registering means and adjusting said device in accordance with said settings.

4. In a weighing machine, a first scale for weighing filled containers, and means for controlling said scale to compensate for variations in tare weight between such containers, said means comprising, a second scale for weighing empty containers, registering means responsive to weight indications of said second scale, said registering means including a plurality of adjustable members successively settable in successive weighing of empty containers in accordance with the successive positions assumed by a weight-indicating portion of said second scale, an adjustable tare weight compensating device associated with said first scale, and means for adjusting said device, said last-named means being successively responsive to settings of said regitering device and adjusting said device in accordance with said settings.

5. In a machine of the class described, a first scale for weighing filled containers, a second scale for weighing empty containers in succession, a plurality of registering means successively responsive to and settable in accordance with movements of said second scale in successive weighings of such empty containers, a device associated with said first scale for adjusting said first scale to compensate for variations in tare weight, and means for adjusting said device, said last-named means being successively responsive to settings of said registering device and adjusting said device in accordance with said settings.

6. In a machine of the class described, a first scale for weighing filled containers, a second scale for indicating the weight of empty containers, registering means responsive to such indications of said second scale and settable in accordance therewith, whereby said registering means can store an impression of the weight of such a container independent of either of said scales and for an indefinite period of time, an adjustable tare weight compensating device associated with said first scale, and means for adjusting said device, said last-named means being successively responsive to settings of said registering means and adjusting said device in accordance with said settings.

7. In a tare weight compensating scale mechanism for use in the filling of containers with a predetermined net weight of a commodity, a tare weight scale having an element displaceable in accordance with a function of the tare weight of a container supported by said scale, a registering device for registering and storing impressions of the tare weights of a plurality of containers, said device having a plurality of movable members, means for resiliently moving said members seriatim into positions with respect to said device determined by the successive positions assumed by said element during successive weighing of containers, a gross weight scale, tare weight compensating means associated therewith, and means for detecting the positions of said members seriatim and adjusting said compensating means in accordance with the positions of said members.

8. In a tare weight compensating scale mechanism for use in the filling of containers with a predetermined net weight of a commodity, a tare weight scale having an element displaceable in accordance with a function of the tare weight of a container supported by said scale, a registering device for registering and storing impressions of the tare weights of a plurality of containers, said device having a base portion and a plurality of members slidable with respect thereto, means for resiliently sliding said members seriatim into positions with respect to said device determined by the successive positions assumed by said element during successive weighings of containers, a gross weight scale, tare weight compensating means associated therewith, and means for detecting the positions of said members seriatim and adjusting said compensating means in accordance with the positions of said members.

9. In a tare weight compensating scale mechanism for use in the filling of containers with a predetermined net weight of a commodity, a tare weight scale having an element displaceable in accordance with a function of the tare weight of a container supported by said scale, a registering device for recording and storing impressions of the tare weights of a plurality of containers, said device having a base portion, a plurality of members movable with respect thereto, and locking means for holding said members in a fixed position with respect to said base portion, means for deactuating said locking means seriatim, means for effecting seriatim resilient movement of said members into positions with respect to said device determined by the successive positions assumed by said element during successive weighing of containers, a gross weight scale, tare weight compensating means associated therewith, and means for detecting the positions of said members seriatim and adjusting said compensating means in accordance with the positions of said members.

10. In a machine of the class described, first scale means for determining the weight of successive empty containers, second scale means for weighing filled containers, said second scale means being adjustable to compensate for the individual tare weights of successive ones of said containers, recording means responsive to said first scale means for automatically receiving and retaining separate impressions of the tare weights of a plurality of said containers, and means responsive to said recording means for automatically adjusting said second scale means in accordance with the impression of the tare weight of a given container retained by said recording means when the gross weight of said container is next to be controlled by said second scale means.

11. In a weighing machine a first scale for weighing filled containers, and means for adjusting said scale to compensate for variations in tare weight between such containers, said means comprising a second scale for weighing empty containers, registering means responsive to and successively settable in accordance with the position of a weight indicating portion of said second scale in successive weighings of such empty containers, an adjustable tare weight compensating device associated with said first scale, and means for adjusting said device, said last-named means being successively responsive to settings of said registering means and adjusting said device in accordance with said settings.

12. In a weighing machine having a first scale for weighing filled containers and a second scale for weighing empty containers, the combination comprising, an adjustable tare weight compensating device associated with said first scale, a plurality of registering means responsive to and successively settable in accordance with the position of a weight indicating portion of said second scale in successive weighings of such empty containers, and means for adjusting said device, said last-named means being successively responsive to settings of said registering means and adjusting said means in accordance with said settings.

13. In a weighing machine having a first scale for weighing filled containers and a second scale for weighing empty containers, means for adjusting said first scale to compensate for variations in tare weight between such containers, said means comprising an adjustable tare weight compensating device associated with said first scale, registering means responsive to and successively settable in accordance with the position of a weight indicating portion of said second scale in successive weighings of such empty containers, and means for adjusting said device, said last-named means being successively responsive to settings of said registering means and adjusting said device in accordance with said settings.

14. In a weighing machine having a first scale for weighing filled containers and a second scale for weighing empty containers, means for adjusting said first scale to compensate for variations in tare weight between such containers, said means comprising an adjustable tare weight compensating device associated with said first scale, registering means responsive to and successively settable in accordance with the position of a weight indicating portion of said second scale in successive weighings of such empty containers, and means for adjusting said device, said last-named means including mechanical elements successively brought into contact with said registering means and responsive to settings of said registering means to adjust said device in accordance with said settings.

JOSEPHUS J. THAYER.

References Cited in the file of this patent

UNITED STATES PATENTS

| Number | Name | Date |
| --- | --- | --- |
| 764,530 | James | July 5, 1904 |
| 1,079,495 | Jeffries | Nov. 25, 1913 |
| 1,402,934 | Hoepner | Jan. 10, 1922 |
| 2,036,538 | Pearson | Apr. 7, 1936 |

FOREIGN PATENTS

| Number | Country | Date |
| --- | --- | --- |
| 431,805 | Great Britain | July 16, 1935 |